Jan. 11, 1955  L. P. CROSS  2,698,960
SAUSAGE LINKING METHOD
Original Filed June 24, 1950  8 Sheets-Sheet 1

INVENTOR.
Lawrence P. Cross,
BY
Cromwell, Greist + Warden
attys

Jan. 11, 1955 L. P. CROSS 2,698,960
SAUSAGE LINKING METHOD
Original Filed June 24, 1950 8 Sheets-Sheet 6

Fig.10.

INVENTOR.
Lawrence P. Cross,
BY
Cromwell, Greist & Warden
Attys.

Jan. 11, 1955 L. P. CROSS 2,698,960
SAUSAGE LINKING METHOD
Original Filed June 24, 1950 8 Sheets-Sheet 7

INVENTOR.
Lawrence P. Cross,
BY
Cromwell, Greist & Warden
ATTYS

United States Patent Office 2,698,960
Patented Jan. 11, 1955

2,698,960

SAUSAGE LINKING METHOD

Lawrence P. Cross, Valparaiso, Ind.

Original application June 24, 1950, Serial No. 170,160, now Patent No. 2,674,004, dated April 6, 1954. Divided and this application February 9, 1954, Serial No. 409,024

6 Claims. (Cl. 17—45)

This invention relates to the manufacture of sausages of the character in which a length of filled or stuffed casing is divided into individual sausage links of generally uniform length and a twist is imparted to the casing between successive links.

This application is a division of application Serial No. 170,160 filed June 24, 1950, now Patent No. 2,674,004, issued April 6, 1954.

It is an object of the invention to provide an improved method for the production of link sausages in which a filled casing is divided at predetermined intervals to form individual sausage links of uniform length and successive links are automatically rotated in the same direction to provide a twist in the casing in the areas joining the links.

It is another object of the invention to provide a sausage linking method in which a filled sausage casing is automatically divided into sections of predetermined length, each successive section is rotated to impart a twist in the casing between it and the next succeeding section, the twisted sections are collected in a coil as the twisting is completed and thereafter the connected sausages are positioned on a smoke stick ready for insertion in the smoke house.

It is a further object of the invention to provide a sausage linking method in which a filled sausage casing is continuously advanced along a predetermined path, the casing is constricted at spaced points to divide the same into individual sausage links, each successive link is rotated to impart a twist in the constricted area between the links, the twisted links are collected in a coiled stack and the coiled stack is positioned on a smoke stick for delivery to the smoke house.

It is a further object of the invention to provide a method of forming from a relatively long length of stuffed casing a series of individual links of uniform length which are separated from each other by twisted casing sections, which method comprises continuously advancing the casing endwise, constricting the casing at intervals while it is being advanced, whereby to divide the casing into link portions, directing each of the thusly divided continuously advancing link portions laterally into a rapidly revolving open-centered coil formed from the preceding link portions, in which coil the link portions are held by centrifugal force against movement relative to each other, and utilizing the end connection of each laterally directed link portion with the revolving link portions preceding it in the coil to effect rotation of the laterally directed link portion relative to the succeeding link portion, whereby to twist the casing therebetween, moving the coil of links while it is revolving to a predetermined position relative to a support, and reducing the speed of rotation of the coil sufficient to permit the coil to collapse and drop onto the support.

It is a still further object of the invention to provide a method of forming from a relatively long length of stuffed sausage casing a series of individual sausage links of uniform length which are separated from each other by twisted casing sections, which method comprises advancing the casing continuously along a predetermined path while constricting the casing at intervals to divide the same into link forming portions of uniform length, guiding the successive link forming portions into a rotating receptacle through a relatively small passageway adjacent the axis of rotation of the receptacle, rotating the receptacle at a relatively rapid rate of speed sufficient to exert a centrifugal pull on the link forming portions as they move through the passageway whereby to axially rotate each link forming portion and impart a twist in the casing between it and the next succeeding link forming portion and to deposit successive twisted links adjacent the inner periphery of the container, and simultaneously moving the links relative to the container as the links accumulate to arrange the links in a single open coil formation.

It is another object of the invention to provide a sausage linking method wherein a filled sausage casing is constricted at spaced intervals to divide the same into a plurality of links of predetermined length, the links are advanced to a twisting mechanism which comprises a rapidly revolving tube-like receptacle which is open at its ends and which is mounted for reciprocable movement in an axial direction with the axis of rotation aligned with the constricting mechanism, a rapidly revolving hub-like member having its axis of rotation aligned with the constricting mechanism and provided with a passageway extending from the center of the end adjacent the constricting mechanism at an oblique angle to the axis of rotation thereof and terminating on the peripheral surface adjacent the other end of the member, a screw-like distributing vane on the periphery of the hub-like member and a rotatable plate associated with the hub-like member which is adapted for separable connection with the tube-like receptacle when the latter is at one end of its axial movement whereby the sausage casing is subjected to a substantially continuous rotating operation in one direction to impart a twist in the casing between successive sausage links as they are formed by the constricting mechanism and whereby the connected links are distributed in coil-like fashion around the interior of the tube-like receptacle, the latter being axially reciprocated upon completion of the twisting operation to position the coil of sausage links for delivery onto a smoke stick.

These and other objects of the invention will be understood from a consideration of the mechanism which has been devised for carrying out the linking method and which is shown by way of illustration in the accompanying drawings, wherein.

Referring to the drawings, there is shown a mechanism which is especially adapted for accomplishing the link forming operations in accordance with the principles of the invention, and which mechanism will divide a continuous length of filled sausage casing into a plurality of links of predetermined length, which will successively rotate each link relative to the remainder of the filled casing to impart a twist between it and the next succeeding link, which will accumulate the twisted links in coil-like fashion in a receptacle and which will deposit the coil of links on a smoke stick for transfer to the smoke oven.

The illustrated mechanism comprises a frame structure including a transversely extending vertical supporting plate-like casing 10, a dividing mechanism 11 arranged on one vertical face or wall of the casing 10, a twisting and accumulating mechanism 12 extending from the opposite face of the casing 10 and a supporting rack 13 for a smoke stick 14. The smoke stick 14 is supported by the rack structure 13 in spaced relation to the twisting and accumulating mechanism 12 and in position to receive the connected link sausages, indicated as 15 in Fig. 1, as batches of the same are delivered to the rack by the accumulating mechanism 12, upon completion of the twisting operation.

Figure 11:
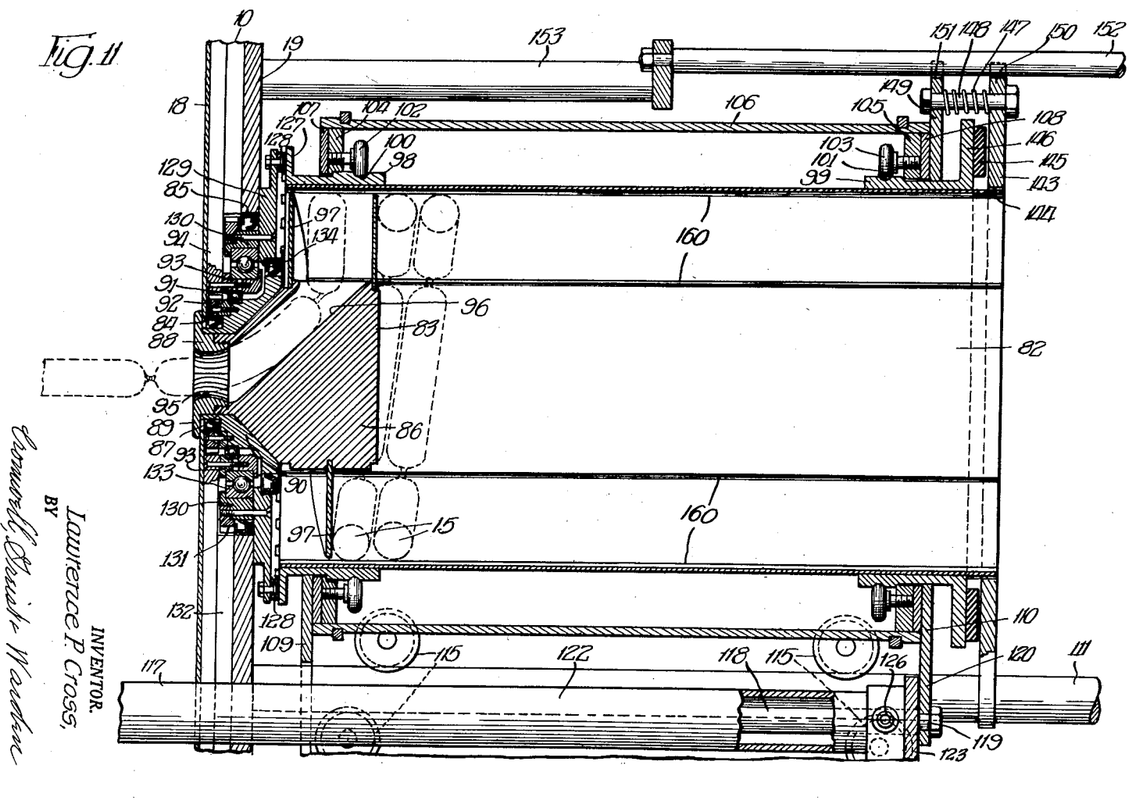
Fig. 11 is a partial longitudinal section through the twisting and distributing mechanism.

The vertical supporting casing 10 rests on a pair of feet 16 and extends upwardly and laterally of the machine in a plane normal to the longitudinal axis of the same. It supports adjacent its upper edge on one face a motor 17 which is connected by gearing to the movable elements of the machine and which furnishes operating power for the same in a manner which will be described. The casing 10 is formed by a plurality of plates arranged in face abutting relation with the front and rear cover plates 18 and 19 (Fig. 11) spaced a sufficient distance to provide in cut-out portions of the intermediate plates a casing for the driving gears.

Figure 5:
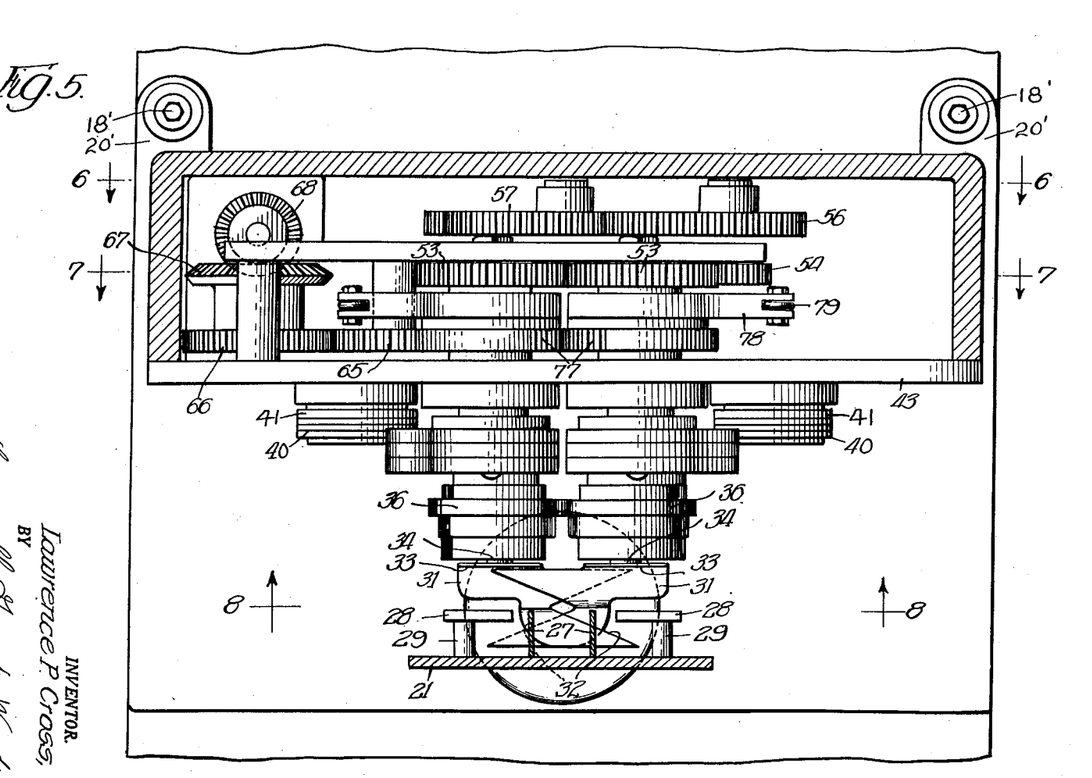
Fig. 5 is a view taken on the line 5—5 of Fig. 1 to a scale enlarged approximately four times and showing the divider mechanism.
Figure 12:
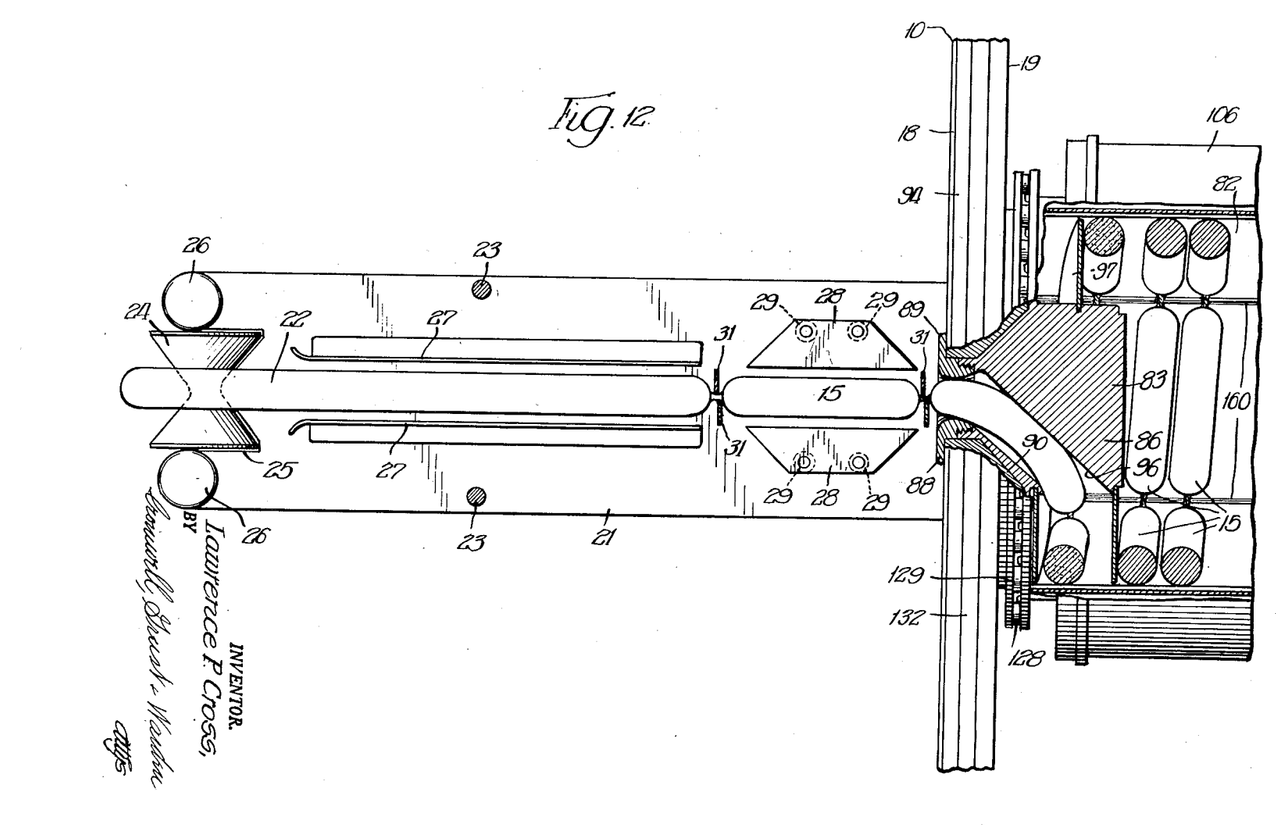
Fig. 12 is a partial plan view of the machine with portions in section and with other portions broken away.

The casing dividing mechanism 11 which is supported on the front plate 18 of the casing 10 includes a horizontally extending gear box 20. The gear box or case 20 is secured by attaching brackets 20' and bolts 18' (Fig. 5) on the plate 18 and encloses the driving gears for the sausage dividing elements which are arranged beneath the same. The gear case 20 also supports the guide plate 21 (Figs. 1, 2 and 12) which extends in parallel spaced relation beneath the lower face of the same for supporting and guiding the stuffed sausage casing 22 to the dividing elements. The supporting plate 21 extends from the vertical plate 18 forwardly beyond the end face of the gear box 20 and is supported therefrom by depending hanger rods 23. A stuffed casing guide roller 24 is journaled in a recess 25 at the end of the plate 21 and side guide members 26 are provided which extend upwardly adjacent the ends of the guide roller 24. A pair of upstanding side guide plates 27 which are laterally spaced extend from adjacent the ends of guide roller 24 to a point spaced some distance short of the vertical plate 18. A pair of horizontally extending laterally spaced guide plates 28 are supported on pins 29 and arranged with their inner edges in generally parallel relation in the space between the ends of the upright guide plates 27 and the vertical plate 18. The ends of the guide plates 28 are located so that there is sufficient space between one of the ends thereof and the adjacent ends of the uprights 27 and between the other of the ends thereof and the vertical plate 18 to permit lateral movement of the dividing elements 31 which operate to constrict the stuffed casing and divide the same into the sausage links 15.

Figure 8:
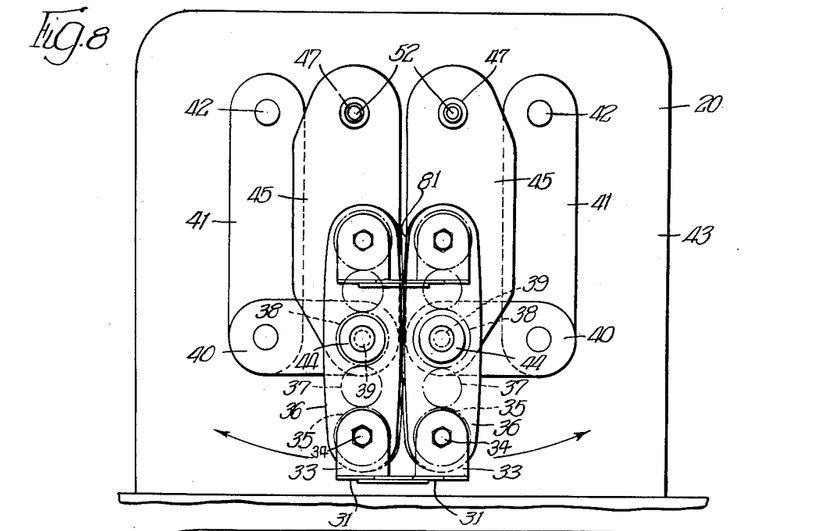
Fig. 8 is a sectional view taken generally on the line 8—8 of Fig. 5 to approximately three-quarters scale.
Figure 9:
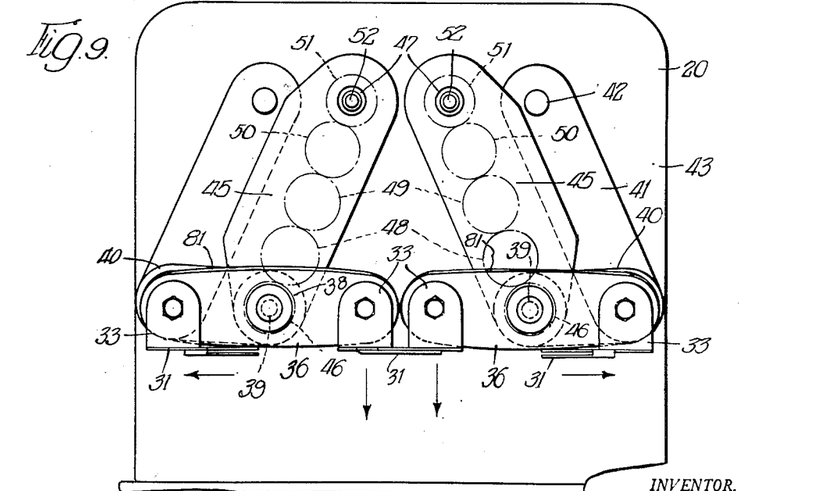
Fig. 9 is a view similar to Fig. 8 with the dividing heads in a different position.

The divider elements or gripper members 31 (Figs. 5, 8 and 9) which are arranged in two cooperating pairs comprise plate-like members having V-shaped slots 32 extending inwardly from their opposed edges. The V-shaped slots 32 divide the elements 31 into inner and outer finger-like portions which are in planes offset relative to each other in the respective pairs of elements 31 to permit them to move toward each other in interleaved relation engaging on opposite sides of the stuffed casing 22 when they are brought toward each other in the constricting operation and forming cooperating gripper members. The V-shaped dividing elements or fingers 31 are each provided with a flange 33 which is connected by a pivot 34 with a gear member 35 enclosed within the end of a generally rectangular head 36. The gears 35 are arranged at opposite ends of the heads 36 and are each connected in driving relation by idler gear 37 with a centrally arranged control gear 38 which is secured on a pin 39 extending through the upper outer wall of the head 36 and secured in fixed relation on one end of a relatively short control link 40. The other end of each link 40 is pivotally connected to one end of a somewhat longer link 41 which is secured in fixed relation at its other end to a pin 42 journaled in the lower wall 43 of the gear box 20.

Figure 6:
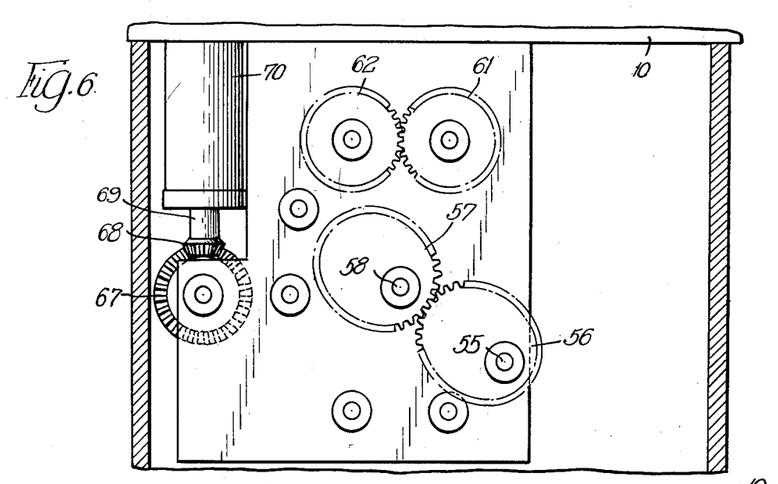
Fig. 6 is a section taken generally on the line 6—6 of Fig. 5 to approximately three-quarters scale.
Figure 7:
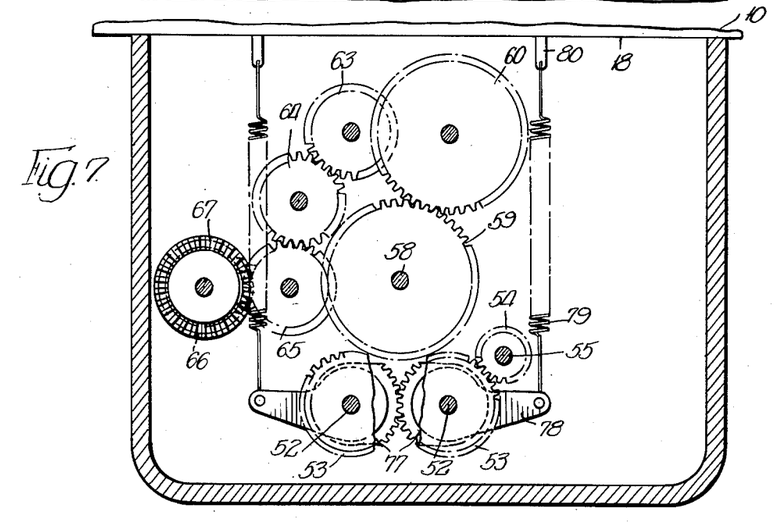
Fig. 7 is a section taken generally on the line 7—7 of Fig. 5 to approximately three-quarters scale.
Figure 10:
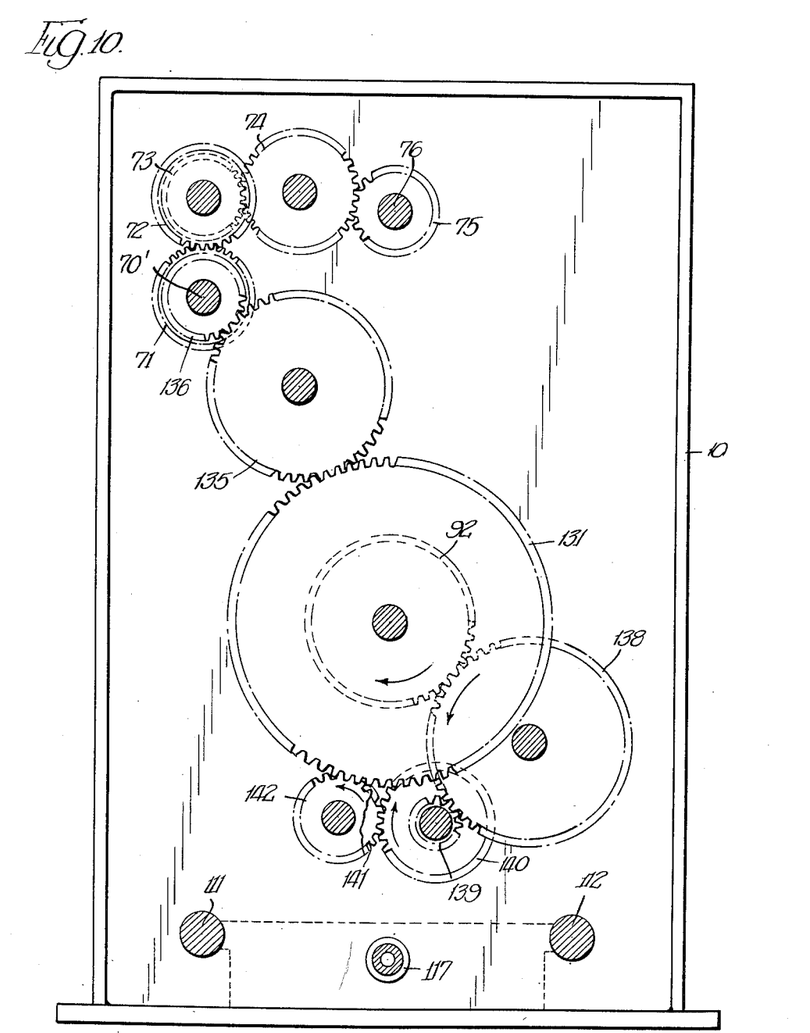
Fig. 10 is a section taken generally on the line 10—10 of Fig. 1 to a scale enlarged approximately three times.

Each divider head 36 is rigidly secured at the center thereof to a flanged sleeve 44 which is journaled for rotation in one end of a head supporting arm 45. A gear 46 is secured on the sleeve 44 and enclosed within one end of the head supporting arm 45. The sleeve 44 surrounds the previously described pivot pin 39 and serves as a bearing for the same. The head supporting arms 45 are secured to bearing sleeves 47 at the other end thereof which are rotatably mounted in the lower wall 43 of the gear box 20. The head operating gear 46 of each arm 45 is connected by idler gears 48, 49 and 50 with a driving gear 51 which is secured on a shaft 52 extending upwardly through the bearing sleeve 47. The shaft 52 is rotatable relative to the bearing sleeve 47 to drive the gear 46 through the connecting gears 48, 49, 50 and 51. The shafts 52 extend into the gear box 20 and carry inner gears 53 (Fig. 7) which are in interengaging driving relation with each other and one of which engages in driving relation with a pinion 54 secured on one end of a rotatably mounted stub shaft 55 which carries at its other end one of a pair of interengaging elliptical gears 56 and 57 (Fig. 6). The other elliptical gear 57 is mounted on one end of a rotatably mounted stub shaft 58 which carries on its other end a relatively large gear 59. Gear 59 is connected in driving relation by a train of gears 60, 61, 62, 63, 64, 65 and 66 with a bevel gear 67. Bevel gear 67 is mounted on a stub shaft and driven by a bevel gear 68 on the end of the driven shaft 69 extending from a change-speed device 70. The change-speed device 70 is driven by means of a chain of gears (Fig. 10) 71, 72, 73 and 74 connecting with driving pinion 75 on the drive shaft 76 of the motor 17, the gear 71 being mounted on the shaft 70' extending into the change-speed device 70.

The head supporting arms 45 are connected to swing or pivot simultaneously by means of intermeshing gear segments 77 (Fig. 7) which are secured on the bearing sleeves 47 (Fig. 9) and within the casing 10. Each gear segment 77 is provided with an arm 78 which is connected to one end of a tension spring 79, the other end of the spring 79 being connected at 80 to the plate 18 of the casing 10. The gear segments 77 insure simultaneous movement of arms 45.

The supporting heads 36 for the dividing fingers 31 are provided with peripheral track-like formations 81 around the edges thereof which are in the same plane and have edgewise engagement with each other as the heads 36 rotate and which determine the path of movement of the divider elements 31. The track formations 81 are generally elliptical so that when the heads 36 rotate the divider elements 31 move toward each other rapidly and then gradually to the closed position. This movement is reversed when they move away from each other to the separated position.

The driving mechanism for rotating the supporting heads 36 causes the same to rotate with alternately increasing and decreasing speed due to the action of the elliptical gears 56 and 57 so that the cooperating divider elements 31 approach engagement with the stuffed casing 22 the speed with which they are traveling is decreasing and when they separate and move away from engagement with the casing 22 the speed with which they are traveling is increasing. Due to the change in speed and the elliptical path of movement of the elements 31 there is a gradual constriction of the casing 22 as the elements approach the same and a rapid movement of the casing 22 forwardly as the dividing elements move the separated link 15 toward the twisting mechanism 12.

The twisting and accumulating mechanism 12 (Figs. 1, 2, 3, 11 and 12) extends longitudinally of the machine from the face 19 on the side of the casing or housing 10 opposite that on which the dividing mechanism 11 is mounted. The mechanism 12 comprises a longitudinally or axially reciprocable receptacle 82 for accumulating the links 15 and a twisting and distributing head 83 which is supported with a portion thereof extending through aligned apertures 84 and 85 in the front and rear plates 18 and 19, respectively, of the casing 10. The twisting and distributing head 83 comprises a relatively short cylindrical body portion 86 of substantial diameter which tapers exteriorly at one end to a portion 87 of reduced diameter. The portion 87 of the head 83 is centrally apertured and internally threaded to receive an externally threaded portion of an apertured plate or collar member 88. The collar member 88 extends through the aperture 84 in the plate 18 and is provided with a flange 89 positioned in overlapping relation to the edges of the plate 18 round the opening 84. A cone-shaped bearing supporting ring 90 surrounds and is secured between the tapered portion of the head 83 and the flange 89 of collar 88.

Ring member 90 carries peripheral bearing member 91 and a ring gear 92. The bearing member 91 is supported in a bearing supporting ring 93 which is secured in fixed relation to an intermediate plate or member 94 within the casing 10. The ring gear 92 rotates the twisting head 83 and the attached collar member 88 relative to the casing 10.

The internal surface 95 defining the central aperture in the collar member 88 is provided with grooves which extend in an axial direction and are spaced around the periphery thereof. The twisting head 83 is provided with a passageway 96 beginning centrally of the reduced end 87 and forming a continuation of the central aperture 95 in the collar 88. The passageway 96 extends at an angle outwardly of the axis of the head portion 86 and terminates on the peripheral surface of the head portion 86. The passageway 96 is of a size somewhat larger than the maximum diameter of the sausages which are being formed and guide the same outwardly relative to the axis of the twisting head which is in alignment with the direction of travel of the stuffed casing as it is divided by the divider elements 31. The twisting head portion 86 is provided on its peripheral surface with a radially extending spiraled distributing flange or vane 97 which projects radially outwardly of the periphery and extends axially of the head portion 86 forming approximately a full turn about the periphery of the same. The ends of the flange 97 are axially spaced a sufficient distance to accommodate the opening forming the terminus of the passageway 96 which is located approximately between the same. The flange or vane 97 operates to position or distribute the completed sausages 15 in the accumulating receptacle 82 in a manner which will be described.

Figure 3:
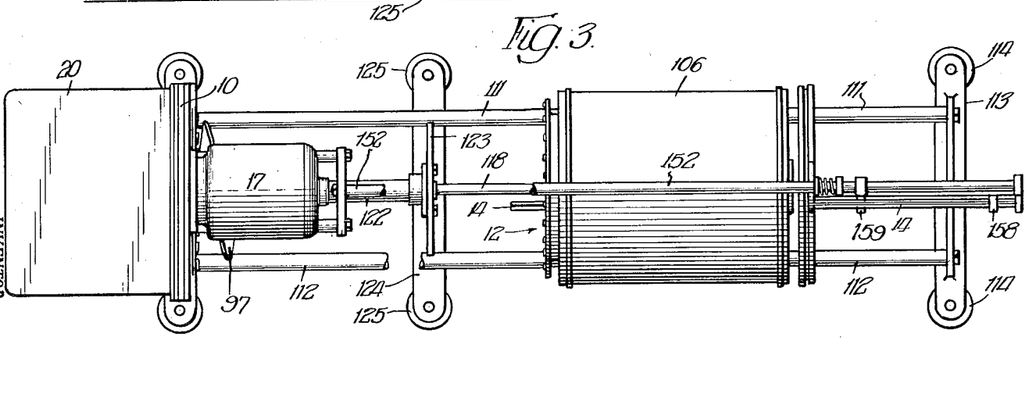
Fig. 3 is a plan view of the machine as shown in Fig. 2.
Figure 4:
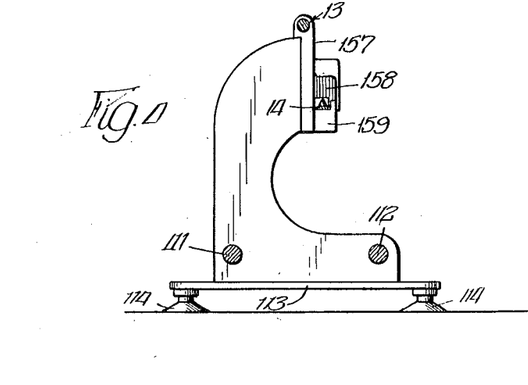
Fig. 4 is a transverse section taken generally on the line 4—4 of Fig. 1.

The receptacle 82 comprises an elongate open-ended tubular section having an internal diameter substantially greater than the cross-sectional diameter of the body portion 86 of the twisting head 83. The accumulating cylinder 82 is secured at its opposite ends within encircling front and rear band members 98 and 99 which are provided with trackway forming grooves 100 and 101, respectively, for receiving supporting rollers 102 and 103 which are rotatably mounted on inwardly extending ring formations 104 and 105 secured at opposite ends of a tubular outer casing member 106. The casing member 106 is provided at its ends with apertured plate members 107 and 108 through which the band members 98 and 99 extend. The end plate members 107 and 108 are secured at the bottom to vertical bottom plates 109 and 110, respectively, which are apertured at opposite sides of the machine for receiving in freely sliding relation supporting guide rods or rails 111 and 112 (Figs. 3 and 4). The guide rods 111 and 112 are secured at one end of the machine to a cross member 113 provided with suitable downwardly projecting feet 114 and at the opposite end to the casing 10 adjacent the bottom thereof. The guide rails 111 and 112 are parallel and support the casing 106 for reciprocal movement toward and from the casing 10. A plurality of rollers 115 are arranged in vertically spaced pairs on bottom side plates 116 which are provided at opposite sides of the casing 106 for engaging the guide rails 111 and 112 on opposite sides to support the casing 106 in freely sliding relation thereon.

The receptacle supporting casing 106 is reciprocated on the guide rails 111 and 112 by hydraulic mechanism 117 (Figs. 1, 2, 3 and 11) which comprises a piston member 118 which is secured at its outer end at 119 to a central depending portion 120 of the end plate 110. The piston 118 reciprocates in a fixed cylinder 122 which is supported adjacent one end by the lower portion of the casing 10 and at the other end by a cross bar 123 which extends between the guide rails 111 and 112 and which projects upwardly of a base member 124 having laterally spaced depending feet 125. The cross bar 123 is longitudinally spaced from the casing 10 a sufficient distance to permit the desired movement of the recepacle 82 between the casing 10 and the supporting structure 13 for the smoke stick 14 at the end of the machine. The hydraulic mechanism 117 is supplied with air or other fluid medium at the connections indicated at 126 and appropriate manually operated or automatic control mechanism (not shown) is provided to insure smooth and efficient movement of the receptacle toward and from the casing 10.

The supporting band 98 at the end of the receptacle 82 adjacent the casing 10 is provided with a radially extending peripheral flange 127 which is adapted to engage friction members 128 peripherally spaced around the margin of a rotatable centrally apertured ring or plate member 129. The ring or plate member 129 is mounted adjacent the outer face of the plate 19 of the casing 10 and is provided with a bearing supporting shoulder or band member 130 which extends into the casing 10 and carries a ring gear 131 operating in a recess provided in an intermediate plate member 132 of the casing 10. A bearing 133 is positioned between the band member 130 and the fixed bearing supporting member 93 which is secured to the intermediate plate member 94 in the casing 10. The ring gear 131 rotates the plate member 129 about the fixed bearing support 93. The twisting head 83 extends through the central aperture 134 in the plate 129 with sufficient clearance between the members to permit relative rotation of the head 83 and the plate 129. The plate 129 is located in a plan transverse of the machine adjacent the outer face of casing member 19 and slightly spaced from the end of the distributing vane 97 on the head 83.

The ring gear 131 (Fig. 10) is meshed with idler gear 135 which in turn meshes with pinion 136 on the shaft 70' extending from the change-speed device 70. Ring gear 92 is driven in the same direction as ring gear 131 but at a different speed by means of the connecting gear train 138, 139, 140, 141 and 142. All of the connecting gears are mounted in the casing 10 in suitable recesses provided in the intermediate plates 94 and 132. Rotation of the ring gear 131 revolves the plate 129 and through engagement of the friction members 128 with the flange 127 of the band member 98 causes rapid rotation of the accumulating receptacle 82 when the latter is positioned with the flange 127 in engagement with the friction members 128. The mounting of the receptacle 82 and the hydraulic control of the reciprocation of the casing 106 results in the receptacle 82 being rapidly rotated by the rotation of the plate 129 when at one end of its longitudinal movement and continuing to rotate rapidly and freely in the casing 106 when moved away from the plate 129 by operation of the hydraulic mechanism 117. With the receptacle 82 rapidly rotating freely therein the casing 106 is adapted to be reciprocated to the other end of its path of longitudinal movement.

At its forward end (Fig. 11) the casing 106 is provided with a braking mechanism comprising an end plate 143 apertured at 144 and positioned in slidable relation over the end of the recepacle 82. The braking plate 143 is adapted to engage a friction ring member 145 secured on the outer face of a radially extending flange 146 on the receptacle supporting band member 99 adjacent the end of the receptacle 82. The braking plate 143 is urged outwardly in non-engaging relation relative to the brake band 145 by a compression spring 147 mounted on a bolt 148 extending between the upper end of the plate 143 and an upstanding supporting plate 149 secured on the end plate 108 of the casing 106, the plate 143 being mounted for free sliding movement on the bolt 148 against the force of the spring 147. The plate 143 is provided with a top groove 150 and plate 149 is provided with a similar groove 151 for receiving in guiding relation a top bar or rod member 152 which extends from the motor support 153 adjacent the housing 10 to the upstanding end frame structure 13. The rod 152 is provided adjacent the frame structure 13 with a stop member 154 which includes a cushion spring 155 and which is engaged by the plate 143 as the hydraulic mechanism 117 moves the receptacle 82 toward the frame 13, the stop 154, 155 functioning to move the plate 143 against the brake ring 145 to stop the free rotational movement of the receptacle 82.

The frame 13 for supporting the stick 14 comprises an end plate 156, which projects upwardly from the bottom end cross plate 113, and a longitudinally extending vertically positioned supporting plate 157. Longitudinally spaced top and bottom bracket members 158 and 159 extend vertically of the supporting plate 157. Both bracket members 158 and 159 are grooved at the bottom and top, respectively, to receive and support in position longitudinally of the machine the smoke stick 14 with the major portion of the stick 14 projecting toward the receptacle 82 and located relatively close to the longitudinal axis of the same so that when the receptacle 82 is moved toward the stick supporting structure 13 the stick 14 projects into the receptacle 82 substantially the full length of the receptacle 82 in position for receiving the sausage links 15 when they are released from the action of centrifugal force by stopping the receptacle 82.

The operation of the machine to divide a stuffed casing into individual sausage links and after providing a twist between the respective links depositing the same on a smoke stick in position for further processing is as follows: The stuffed sausage casing 22 is fed over the guide roller 24 and between the side guide plates 27 into position for engagement by the divider elements 31 on the divider heads 36. The divider heads 36 are rotated by the driving mechanism to bring the cooperating pairs of divider elements 31 from opposite sides of the path of travel of the casing 22 into constricting relation with the same to separate the material in the casing at spaced points and provide a constricted area between the individual sausage links thus formed. As the heads 36 rotate, the pair of dividers 31 which has been brought into constricting relation with the casing moves forwardly along a longitudinal path and delivers the link which has been formed into the grooved aperture 95 in the twisting head 83 and through the passageway 96 in the body 86 of the head 83. The rotation of the head 83 causes the formed link to revolve axially and impart a predetermined number of twists in the area between the link in the passageway 96 and the next succeeding link which is being formed by the dividers 31. The dividers 31 which carry the formed link forwardly separate with increasing speed as they reach the end of the longitudinal movement adjacent the collar member 88 of the twisting head 83.

Figure 1:
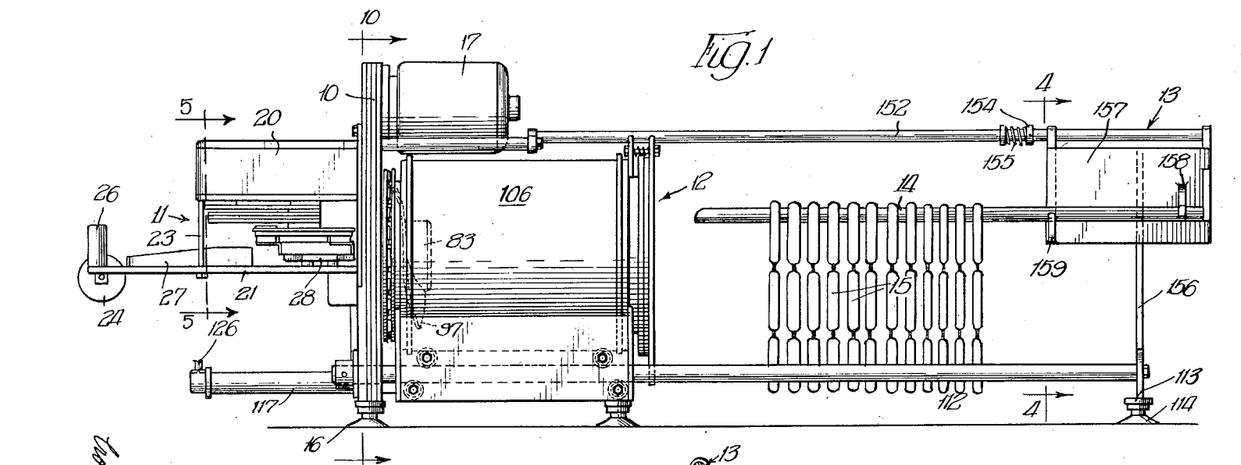
Fig. 1 is a side elevation of a machine which is adapted to form a length of stuffed casing into a plurality of links in accordance with the principles of the invention.
Figure 2:
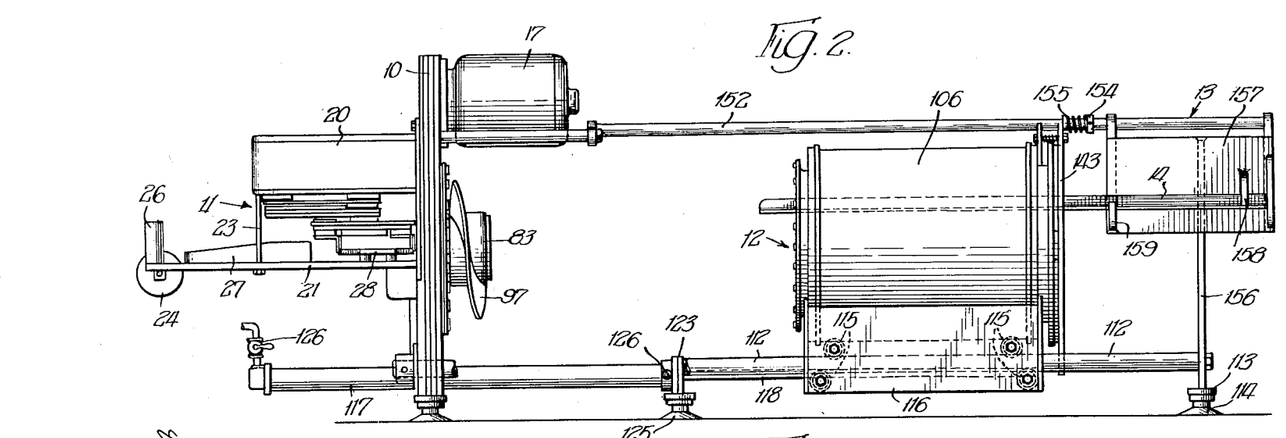
Fig. 2 is a side elevation similar to Fig. 1 but showing a different stage in the operation of the machine.

As the individual sausages 15 move through the passageway 96 they are carried by centrifugal force against the interior surface of the receptacle 82 which is also revolving rapidly in the same direction as the twisting head 83 but at a speed somewhat slower. The distributing vane 97 on the twisting head 83 guides or distributes the completed links 15 in the receptacle 82 so that the connected links 15 are arranged in single coil-like fashion around the interior periphery of the receptacle 82. The coil of links which is formed is moved ahead in the receptacle 82 by the distributing vane 97 as each successive link is formed. The receptacle 82 is provided with longitudinally extending grooves 160 circumferentially spaced around the interior of the receptacle 82 and the surface of the receptacle is kept moist so that the coil of sausages will move in the receptacle 82 without sticking to the walls of the same. When the length of casing 22 is completely divided and the sausages 15 are all twisted, the hydraulic mechanism 117 is operated either manually or by suitable automatic means (not shown) to move the carriage 106 away from the rotating plate 129 to disconnect the drive for the same. With the receptacle 82 rotating freely therein the casing 106 is moved to the other end of its path to bring the receptacle 82 over the stick 14 which is supported on the plate 157 and to actuate the braking mechanism 154, 155 for stopping the receptacle 82. When the rotation of the receptacle 82 is stopped the coiled links 15 are released from the action of centrifugal force which holds them against the wall of the receptacle 82 while the latter is rotating, to drop onto the stick 14 in position for removal to a smoke oven for further processing. The mechanism may be adjusted by use of gears of the proper size to provide for proper coiling of the sausages in the receptacle 82 without crowding or pulling and in position so that when the coil is discharged or dropped onto the stick 14 the connected links hang therefrom in a multiplicity of depending coils each containing the same number of links as indicated in Fig. 1.

I claim:

1. A method of forming from a relatively long length of stuffed casing a series of individual links of uniform length which are separated from each other by twisted casing sections, which method comprises advancing the casing along a predetermined path while constricting the casing at intervals to divide the same into link forming portions of uniform length, guiding the successive link forming portions in a continuously moving stream through a relatively small passageway, guiding the links outwardly from the passageway and arranging the links in coil forming relation while imparting a rapid rotation to the coil formed by preceding links whereby each successive link is axially rotated as it moves through the passageway to form a twist in the casing section between it and the next succeeding link and the twisted links are caused to move radially outwardly of the passageway a predetermined distance and to arrange themselves in the coil formation due to the centrifugal pull exerted on the links as they emerge from the passageway by the rapid rotation of the preceding links, moving the links in the coil while they are in coiled formation in the direction of the axis of rotation of the coil away from the passageway, thereafter moving the coil as a unit, when all the links are twisted, to a predetermined position relative to an elongate support and reducing the speed of rotation of the coil to permit the coil to collapse and drop onto the support.

2. A method of forming from a relatively long length of stuffed casing a series of individual links of uniform length which are separated from each other by twisted casing sections, which method comprises advancing the casing along a predetermined path while constricting the casing at intervals to divide the same into link forming portions of uniform length, guiding the successive link forming portions in a continuously moving stream through a relatively small passageway, guiding the links outwardly from the passageway in a spiral path and accumulating the links in coil forming relation while imparting a rapid rotation to the coil formed by preceding links, whereby each successive link is axially rotated as it moves through the passageway to form a twist in the casing section between it and the next succeeding link and the twisted links are caused to move radially outwardly of the passageway a predetermined distance and to arrange themselves in the coil formation due to the centrifugal pull exerted on the links as they emerge from the passageway by the rapid rotation of the preceding links, moving the coil as a unit, when the twisting and accumulating operations are completed, to a predetermined position relative to a support, and reducing the speed of rotation of the coil to permit the coil to collapse and drop onto the support.

3. A method of forming a length of filled casing into a series of individual links which are separated from each other by twisted sections of the casing, which method comprises continuously advancing the filled casing in a predetermined path, constricting the casing at intervals without interrupting its movement, whereby to preliminarily divide the filled casing into individual links of predetermined length, guiding the successive links without interruption through a free and unobstructed passageway of slightly larger diameter than the diameter of the casing, axially rotating each individual link as it advances through the passageway, guiding the previously twisted links radially outwardly of the axis of rotation and causing the twisted links to arrange themselves in an open coil formation, the coiled links being rotated at a sufficiently high rate of speed to exert a centrifugal pull on the succeeding links and cause them to move outwardly away from the passageway and into the coil formation, moving the coil of links while it is rotating at high speed to a predetermined position relative to a support, and reducing the speed of rotation of the coil to cause the coil to collapse and drop onto the support.

4. A method of forming from a relatively long length of stuffed casing a series of individual links which are separated from each other by twisted casing sections, which method comprises advancing the casing along a predetermined path while constricting the casing at intervals to divide the same into link forming portions of uniform length, guiding the successive link forming portions in a continuously moving stream through a relatively small passageway, axially rotating each successive link as it moves through the passageway to form a twist in the casing section between it and the next succeeding link, causing the twisted links to accumulate in a coil by rotating the preceding coiled links at a high rate of speed sufficient to exert a centrifugal pull on the links and move the same in a radial direction outwardly away from the passageway, while limiting the movement of the links in the radial direction, whereby to cause the links to arrange themselves in coiled relation, advancing the coil of links in the direction of the axis of rotation thereof to a predetermined position, and reducing the speed of rotation of the coil sufficiently to permit the coil to collapse and drop onto a support positioned within the coil.

5. A method of forming from a relatively long length of stuffed casing a series of individual links of uniform length which are separated from each other by twisted casing sections, which method comprises continuously advancing the casing endwise, constricting the casing at intervals while it is being advanced, whereby to divide the casing into link portions, directing each of the thusly divided continuously advancing link portions laterally into a rapidly revolving open-centered coil formed from the preceding link portions, in which coil the link portions are held by centrifugal force against movement relative to each other, and utilizing the end connection of each laterally directed link portion with the revolving link portions preceding it in the coil to effect rotation of the laterally directed link portion relative to the succeeding link portion, whereby to twist the casing therebetween, moving the coil of links while it is revolving to a predetermined position relative to a support, and reducing the speed of rotation of the coil sufficient to permit the coil to collapse and drop onto the support.

6. A method of forming from a relatively long length of stuffed casing a series of individual links of uniform length which are separated from each other by twisted casing sections, which method comprises continuously advancing the casing endwise, constricting the casing at intervals while it is being advanced, whereby to divide the casing into link portions, directing each of the thusly divided continuously advancing link portions laterally into a rapidly rotating open-centered coil formed from the preceding link portions, in which coil the link portions are held by centrifugal force against movement relative to each other, the end connection of each laterally directed link portion with the revolving link portions preceding it in the coil being utilized to effect rotation of the laterally directed link portion relative to the succeeding link portion, whereby to twist the casing therebetween, positioning the rotating coil in predetermined relation over a support, and reducing the speed of rotation of the coil to permit the coil to collapse and drop onto the supporting member.

No references cited.